United States Patent
Dolenti et al.

(10) Patent No.: US 9,188,237 B2
(45) Date of Patent: Nov. 17, 2015

(54) VARIABLE-SPEED ACTUATOR

(75) Inventors: William T. Dolenti, Lynchburg, VA (US); Daniel J. Morris, Forest, VA (US)

(73) Assignee: Flowserve Management Company, Irving, TX (US)

( * ) Notice: Subject to any disclaimer, the term of this patent is extended or adjusted under 35 U.S.C. 154(b) by 573 days.

(21) Appl. No.: 13/054,704

(22) PCT Filed: Jul. 18, 2008

(86) PCT No.: PCT/US2008/070545
§ 371 (c)(1),
(2), (4) Date: Apr. 6, 2011

(87) PCT Pub. No.: WO2010/008398
PCT Pub. Date: Jan. 21, 2010

(65) Prior Publication Data
US 2011/0175006 A1    Jul. 21, 2011

(51) Int. Cl.
F16K 31/04    (2006.01)

(52) U.S. Cl.
CPC ....................... F16K 31/04 (2013.01)

(58) Field of Classification Search
CPC ...... F16K 31/04; F16K 31/047; F16K 31/048
USPC .............. 251/129.11, 129.13, 129.04
See application file for complete search history.

(56) References Cited

U.S. PATENT DOCUMENTS

| | | | | |
|---|---|---|---|---|
| 3,470,428 A | * | 9/1969 | Gill et al. | 318/594 |
| 4,489,267 A | * | 12/1984 | Saar et al. | 318/811 |
| 4,621,789 A | | 11/1986 | Fukamachi | |
| 5,810,245 A | * | 9/1998 | Heitman et al. | 236/49.3 |
| 5,919,260 A | * | 7/1999 | Belzile | 713/300 |
| 6,028,384 A | | 2/2000 | Billman et al. | |
| 6,170,241 B1 | * | 1/2001 | Shibilski et al. | 56/11.9 |
| 6,371,162 B1 | * | 4/2002 | Groeneveld | 137/613 |
| 6,528,915 B1 | * | 3/2003 | Moskob | 310/71 |
| 8,118,571 B2 | * | 2/2012 | Krisher | 417/415 |
| 2004/0231640 A1 | * | 11/2004 | Iwasaki et al. | 123/396 |
| 2006/0017032 A1 | | 1/2006 | DeWall et al. | |
| 2006/0081208 A1 | | 4/2006 | Sturdy et al. | |
| 2006/0102864 A1 | * | 5/2006 | Bria et al. | 251/129.13 |
| 2007/0017217 A1 | * | 1/2007 | Kouzu et al. | 60/289 |

FOREIGN PATENT DOCUMENTS

| | | |
|---|---|---|
| CN | 2793483 Y | 7/2006 |
| CN | 1877983 A | 12/2006 |
| CN | 101061339 A | 10/2007 |

(Continued)

OTHER PUBLICATIONS

International Search Report for International Application No. PCT/US2008/070545, mailed Dec. 22, 2008, 3 pages.

(Continued)

Primary Examiner — Marina Tietjen
(74) Attorney, Agent, or Firm — TraskBritt, P.C.

(57) ABSTRACT

A valve actuator including an electric motor is disclosed that includes a solid-state motor controller capable of operating a motor at variable speeds and a gear set that provides inherent braking. The speed and torque of the valve actuator may be selected. The speed and torque experienced by a valve may be varied over the length of a valve stroke. The valve actuator may include logic sufficient to act as a process controller.

17 Claims, 5 Drawing Sheets

(56) References Cited

FOREIGN PATENT DOCUMENTS

| | | |
|---|---|---|
| CN | 101113793 A | 1/2008 |
| EP | 1054199 | 11/2000 |
| EP | 1102052 | 5/2001 |
| EP | 0 903 522 B1 | 5/2005 |
| EP | 1601092 * | 11/2005 |
| GB | 2340915 | 3/2000 |
| JP | 09502860 A | 3/1997 |
| JP | 2002-303374 | 10/2002 |
| JP | 2008-157262 | 10/2008 |
| WO | W09915822 | 4/1999 |
| WO | 99/54987 A1 | 10/1999 |
| WO | 0202924 A1 | 1/2002 |
| WO | 0216751 A1 | 2/2002 |
| WO | WO2006045027 | 4/2006 |
| WO | 2007050327 A2 | 5/2007 |

OTHER PUBLICATIONS

Supplemental European Search Report for Application No. 08796328.6, mailed Oct. 4, 2011, 6 pages.

European Extended Search Report for Application No. 11164661.8, mailed Oct. 4, 2011, 7 pages.

Search Report for Office action in Chinese Application No. 201310062669.9 dated Aug. 27, 2014, 10 pages.

* cited by examiner

VARIABLE-SPEED ACTUATOR

CROSS-REFERENCE TO RELATED APPLICATION

This is a national phase entry under 35 U.S.C. §371 of International Patent Application PCT/US2008/070545, filed Jul. 18, 2008, published in English as International Patent Publication WO 2010/008398 A1 on Jan. 21, 2010, the entire disclosure of which is hereby incorporated herein by this reference.

TECHNICAL FIELD

The invention relates generally to valve actuators including electric motors and, more particularly, to the control of such valve actuators.

BACKGROUND

Valve actuators find wide application in a number of industries, such as, power generation of all types, petroleum and petrochemicals, textiles, paper, and food processing. The operating speed and torque provided by a valve actuator are important parameters. Generally, a fixed speed motor is coupled to a gear set to provide just the right combination of speed and torque to a valve. The exact motor and gear set have to be coupled by a manufacturer. If a manufacturer wants to have a quick turnaround time to customer orders, the manufacturer must stock a wide variety of motors and gear sets. Additionally, a specialized workforce must be employed that is knowledgeable in the assembly of sometimes hundreds of different variations on a single generic valve actuator design.

Furthermore, even if multiple customers want a valve actuator with exactly the same speed and torque characteristics, often customers will have different power supplies available. One customer may want to use 480 VAC three-phase at 60 Hz; another customer may want to use 110 VAC single-phase at 50 Hz; and yet another customer may only have 24 VDC available. Previously known systems do not provide a valve actuator that is supplied off-the-shelf to meet the needs of customers with different power supplies available.

Currently, if a user wants to change the torque and speed characteristics of a valve actuator, the actuator has to be pulled from service, disassembled, and then reassembled with a different gear sets and/or motor. What is needed is a way to reduce the number of motors and gear sets that must be stocked to meet customer needs. There is a further need to reduce the number of models that employees must be trained to build. Additionally, there is a need to permit adjustment of the speed and torque delivered by an actuator without requiring disassembly.

Additionally, fixed speed valve actuators have limited utility as process controllers because the valve is always operated at a fixed speed. What is needed is a way to allow a valve actuator to operate as a process controller.

One attempt to solve these problems was through the use of a rectifier and chopper to control the current sent a DC motor. This allowed for high or low voltage AC current that was either single- or three-phase to be used and allowed the speed and torque of the motor to be controlled. A variation on this attempt was to rectify AC, then use an inverter to control an AC motor. However, these attempts required the use of torque limit switches. An operator could mechanically adjust the speed and torque delivered by a valve actuator, but at most, an operator could only set a maximum torque or speed that should not be exceeded by the valve actuator. An operator could not set a speed or torque profile that would vary over the length of a valve stroke without limit switches. A gear set was included with the valve actuator and was located within the housing of the valve actuator.

The previous attempts require a user to adjust speed and torque potentiometer and do not permit an operator to set a speed or torque profile that would vary over the length of a valve stroke. These attempts do not provide a way to set the speed and torque of a valve actuator without bulky mechanical switches and torque limit switches, nor do they provide a mechanism where the valve actuator could operate as a process controller.

Other attempts to solve the above problems have used switched reluctance motors and DC motors to provide variable speeds. However, in those cases, the valve actuator requires a separate braking mechanism to keep the motor from spinning in the event of a power loss. What is needed is a valve actuator capable of variable speeds that simply and inherently has braking capabilities.

DISCLOSURE OF THE INVENTION

One embodiment of the invention is a valve actuator comprising a variable-speed motor, a solid-state motor controller operably connected to the variable-speed motor and configurable to operate the variable-speed motor, and a worm/worm-gear set operably connected to the variable-speed motor.

Another embodiment of the invention is a valve actuator comprising a universal field-connection block, a power converter operable to receive a power supply, a variable-speed motor, a solid-state motor controller operably connected to the power converter and the motor controller configurable to operate the variable-speed motor, and a braking device operably connected to the variable-speed motor, the braking device comprised of a gear set.

Yet another embodiment of the invention includes a valve actuator comprising a housing, a motor controller, a variable-speed motor with an output shaft, wherein the variable-speed motor is configured for control by the motor controller, and the motor controller and the variable-speed motor integrated within the housing and a gear train outside of the housing and operatively coupled to the output shaft.

A particular embodiment of the invention includes a method of operating a valve actuator, the method comprising providing a valve actuator comprising a solid-state motor controller operably connected to a variable-speed motor, wherein a gear set is operably connected to the variable-speed motor, setting the speed on the solid-state motor controller at which the variable-speed motor will be driven by the solid-state motor controller when the valve actuator is operated, and locking the variable-speed motor with the gear set against back-driving loads in the event of a power failure.

Another embodiment of the invention includes a method of actuating an electrically driven valve actuator, the method comprising receiving a command signal at a solid-state valve actuator controller operably connected to the electrically driven valve actuator including a gear set, wherein the electrically driven valve actuator is capable of variable speeds, receiving a feedback signal at the solid-state valve actuator controller, determining if there is a difference between the command signal and the feedback signal, and minimizing any difference between the command signal and the feedback signal by actuating the electrically driven valve actuator.

Another embodiment of the invention is a system for actuating a valve, the system comprising: a valve actuator, wherein the valve actuator comprises a motor, wherein the motor comprises an output shaft, a solid-state motor controller operably connected to the motor and capable of operating the motor at variable speeds and torques, and a worm/worm-gear set coupled to the output shaft of the motor.

BRIEF DESCRIPTION OF THE DRAWINGS

While the specification concludes with claims particularly pointing out and distinctly claiming that which is regarded as the present invention, this invention can be more readily understood and appreciated by one of ordinary skill in the art from the following description of the invention when read in conjunction with the accompanying drawings in which:

DETAILED DESCRIPTION OF THE INVENTION

A valve actuator including an electric motor is disclosed that includes a solid-state motor controller capable of operating a motor at variable speeds and a gear set that prevents load forces from back-driving an output shaft. The speed and torque of the valve actuator may be selected. The invention can obviate the need to install torque limit switches or other torque-dedicated torque-sensing means and separate braking mechanisms in a valve actuator.

Figure 1:
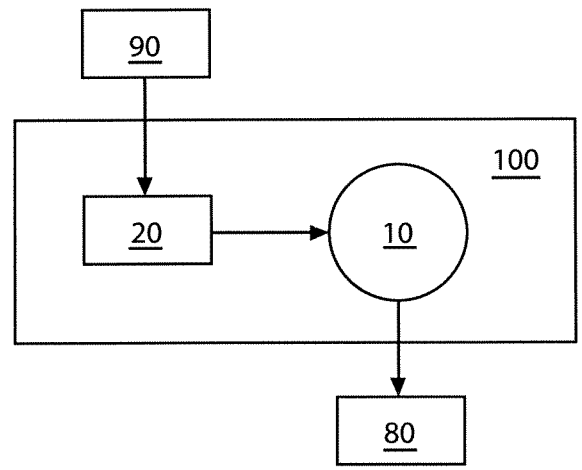
FIG. 1 is a schematic view of an embodiment of a valve actuator capable of variable speeds, including a motor controller and motor capable of variable speeds.

For ease of discussion, the same numerals can represent similar elements in the figures. Referring now to FIG. 1, a particular embodiment of a valve actuator 100 comprises motor controller 20 and variable-speed motor 10. Motor controller 20 receives electrical input from power supply 90. Motor controller 20 controls the output of electrical energy to variable-speed motor 10. Variable-speed motor 10 may be coupled to valve 80. Alternatively, variable-speed motor 10 may be coupled to an actuator gear box (rotational or linear output), which, in turn, may be coupled to valve 80 or other driven load.

Variable-speed motor 10 may be any suitable motor known in the art. Numerous variable-speed motors are contemplated by the invention. Virtually any AC motor, with the proper controller and converter may function at variable speeds. Variable-speed motor 10 includes single-phase and poly-phase induction motors. Included within the poly-phase induction motors are the four general groups of Designs A & B, C, D, and F and the accompanying subgroups. Variable-speed motor 10 may be other AC motors, such as, wound-rotor motors, multi-speed motors, constant and variable-torque motors, and universal motors. Synchronous motors including non-excited synchronous motors, both hysteresis and reluctance designs, and DC-excited synchronous motors may be used. Variable-speed motor 10 may also be a servomotor, brushless servomotor, and linear motor.

Variable-speed motor 10 may also be a DC motor. Suitable DC motors include, for example, shunt-wound, series-wound, compound-wound, and brushless DC motors. Variable-speed motor 10 may also be a brush or brushless DC linear motor or a coreless motor. Variable-speed motor 10 may have any number of poles, such as when a ring motor or pancake motor is used. Variable-speed motor 10 may be a limited-angle torque motor or a brushless DC motor wired as a limited-angle torque motor. Variable-speed motor 10 can include permanent magnet stepper motors (such as disk-type motors), magnet-less brushless stepper motors (such as variable reluctance motors), and switched reluctance brushless DC motors (also known as hybrid permanent-magnet motors). Variable-speed motor 10 can include stepper motors, such as two-, three-, four-, or five-phase motors, and DC servomotors.

The foregoing list of motors is not meant to be limiting, but rather to provide examples of the wide variety of motors that may be used as variable-speed motor 10. Any motor that can be driven at variable speeds by any method of control may be used as variable-speed motor 10. Additionally, although servomotors have been delineated as a specific type of motor, it should be understood that motor position feedback could be integrated with any of the above motors.

Motor controller 20 may be any controller capable of controlling the speed and torque of variable-speed motor 10. In one embodiment, motor controller 20 can be a solid-state controller. The term "controller" is used herein to refer to both controllers and drives. Motor controller 20 will vary depending upon the type of motor used. DC motors with brushes are comprised of mainly a wound stator called the "field" and a wound rotor called the "armature." "Windings" or "wound" as the term is used herein, refers not only to wire wrappings, but also to metal layers and to the frame for the windings (which typically comprise ferrous metal laminations). For example, for a series-wound DC motor, the armature and the field are connected in series. The motor speed is approximately directly proportional to the current fed to the motor. Therefore, controlling the voltage that is fed to the motor will control the speed of the motor. Controlling the current will control the motor torque. Motor controller 20 may include a variable resistor, such as a potentiometer or rheostat. For example, triacs and silicon-controlled rectifiers (SCRs) may also be used. Any suitable technique compatible with the variable-speed motor 10 may be used.

Shunt-wound DC motors have separate field and armature power supplies. Therefore, a different type of control is required. When the field has a fixed supply and the armature supply is varied, this is referred to as "armature-voltage control." Armature-voltage control provides for constant torque over the speed range. When the field is varied and the armature supply is fixed, this is referred to as "shunt-field control." Shunt-field control provides for constant horsepower over a speed range. Compound-wound DC motors use both series and shunt-field windings. Motor controller 20 may provide armature-voltage control, shunt-field control, or compound-wound motor control.

Brushless DC motors do not have a wound armature, but instead use a permanent magnet as the rotor. Instead of brushes, the current in the field windings (laminated metal layers) is switched back and forth as necessary to create the required alternating magnetic fields to spin the permanent magnet rotor. PWM is commonly used to control the switching speed; however, motor controller 20 may employ any suitable method to control speed and/or torque.

AC induction motors have a wound stator rotor and may have a rotor with wound windings or conductive "bars" (squirrel cage), but power is only fed to the stator. The speed of AC motors is most often controlled by varying the power supply frequency and voltage. In a particular embodiment of the invention, motor controller 20 may be a variable frequency drive (VFD). A VFD essentially converts AC to DC and then inverts the DC current back into AC. The inverter controls the voltage and frequency of the output AC wave. The output frequency determines the speed of the AC motor. The output voltage determines the motor torque. Suitable devices that can be used to accomplish AC-to-DC conversion include, for example: diodes, rectifiers, thyristors, and SCRs. Semiconductors, such as insulated (also referred to as isolated) gate bipolar transistors (IGBTs), may be used to invert the DC current to AC current. Alternatively, bipolar transistors, FETs, MOSFETs, and transistor-transformers may be used. Synchronous motors are controlled in a similar manner as induction motors. Motor controller 20 may be any suitable controller capable of controlling the speed and/or torque of an AC motor known in the art.

Figure 2:
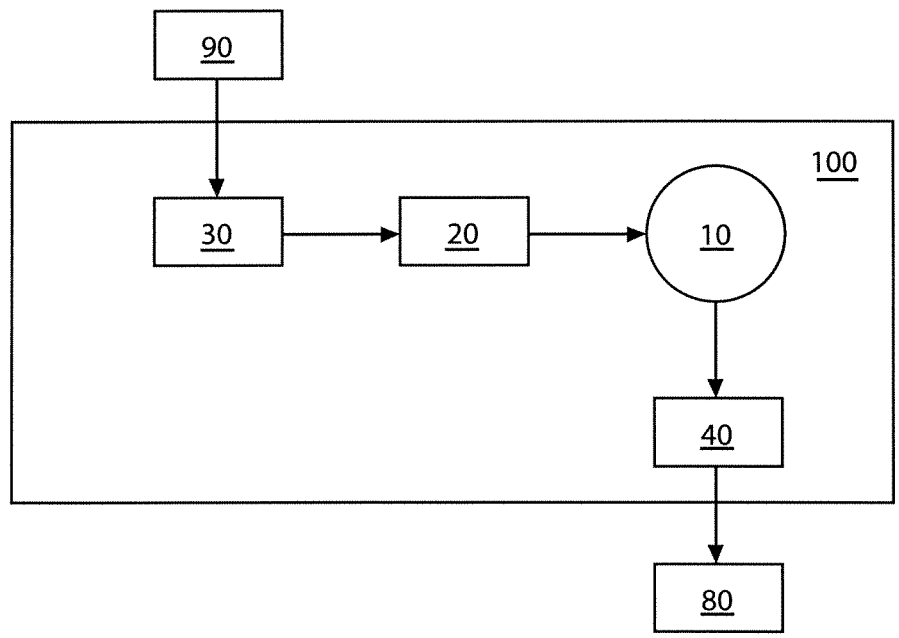
FIG. 2 illustrates the addition of a power converter and gear set to the embodiment shown in FIG. 1.

FIG. 2 illustrates an embodiment of the invention where the valve actuator 100 further includes a power converter 30 and gear set 40. Power converter 30 receives electrical input from power supply 90 and outputs an appropriate electrical supply to motor controller 20. Gear set 40 is coupled to the output shaft of variable-speed motor 10. Gear set 40 is, in turn, coupled to valve 80.

Figure 3:
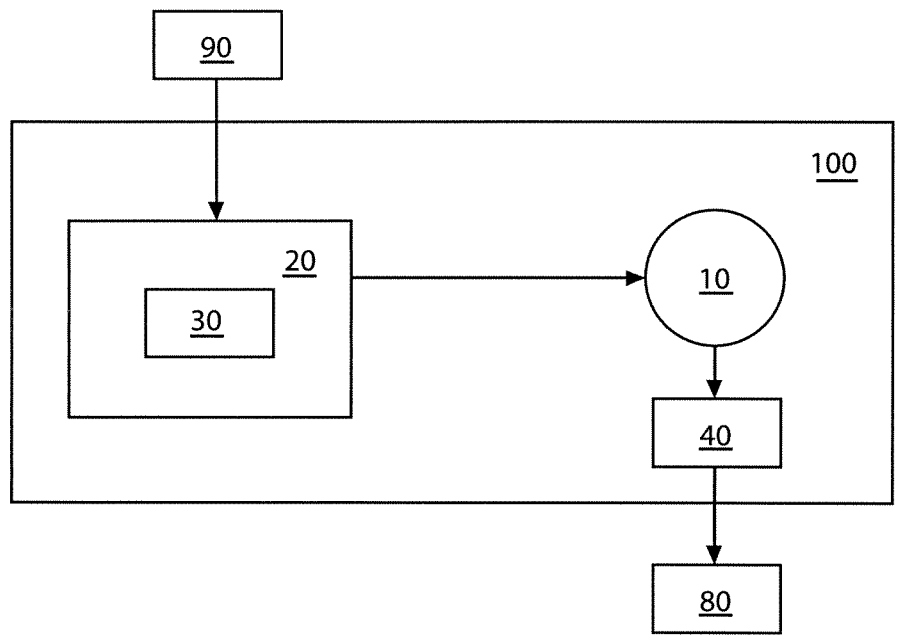
FIG. 3 illustrates merging the power converter and the motor controller according to an embodiment of the invention.

In another embodiment shown in FIG. 3, power converter 30 may be integrated within the same housing as motor controller 20. Some or all of the functions of power converter 30 may also be accomplished by motor controller 20. For example, when a VFD is used as the motor controller 20, the VFD can also perform the function of converting single-phase AC to three-phase AC. Therefore, a separate phase converter is not necessary. However, it may be desirable to have a separate phase converter built into the universal power converter 30 rather than utilizing a VFD for this purpose. VFDs can also perform AC-to-DC conversion and inversion back to AC. Therefore, when motor controller 20 includes a VFD, those aspects of power conversion could be performed by the motor controller 20.

Figure 4:
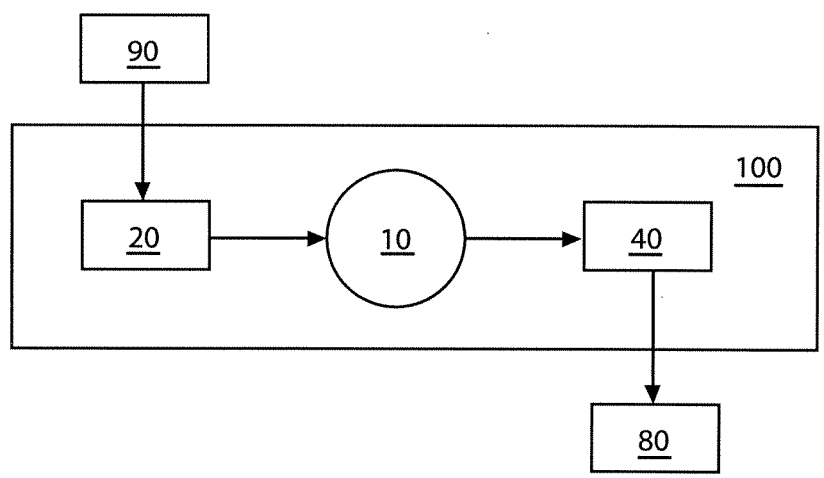
FIG. 4 illustrates an embodiment of the invention without a power converter.

Additionally, as shown in the embodiment of FIG. 4, there may be situations where power converter 30 is not required. Power converter 30 may be a transformer (e.g., a variable transformer) capable of changing the power supply 90 from one voltage to another voltage. Power converter 30 may also be an AC-to-AC converter, DC-to-DC converter, DC-to-AC inverter, or a phase converter. Power converter 30 may also be designed to be a universal power converter. Thus, power converter would be able to take any commonly used voltage and current type and convert it into a form usable by the motor controller 20. In an alternative embodiment, the power converter can create low voltage ac and/or dc power that can power the on-board position or process controller and also may source power to drive external devices (e.g., switches, indicators, and status signals). Power supply 90 may be any power supply available. A few examples of power supply 90 include: 208 to 690 VAC three-phase, 50 or 60 Hz; 120 or 230 VAC, single-phase; 12 VDC; 24 VDC; and 48 VDC. Embodiments of the present invention may be able to accept any voltage from 24 VDC up to 690 VAC.

Power converter 30 may be a single device or multiple devices. For example, power converter 30 may include the previously mentioned DC converter, an AC step-down or step-up transformer, or a phase converter.

Figure 5:
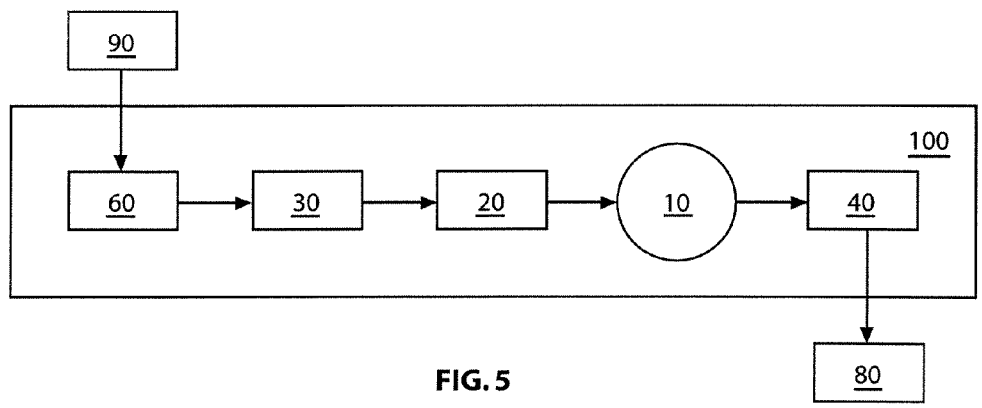
FIG. 5 illustrates an embodiment that includes a field-connection terminal as part of the valve actuator according to an embodiment of the invention.

Referring to the embodiment of FIG. 5, field-connection block 60 may also be included in the valve actuator 100. Field-connection block 60 may be designed in any manner necessary to connect power supply 90 to either power converter 30 or motor controller 20. Field-connection block 60 may also be integrated into a single device with power converter 30 and/or motor controller 20. Field-connection block 60 could be designed as a universal connection block for use with a universal power converter 30. In that particular embodiment, the field-connection block 60 could be designed with the appropriate posts, lugs, cam locks, pin and sleeve connectors, or other connection devices to handle any voltage or amperage delivered by power supply 90. The field-connection block 60 could also have a single connection mechanism or multiple connection mechanisms. For example, field-connection block 60 may have a single set of posts upon which lugs may be secured for both AC and DC wires. Alternatively, field-connection block 60 may have a set of posts and/or lugs for DC wires, and a set of posts and/or lugs for AC wires. Field-connection block 60 may also have multiple sets of AC and DC connection mechanisms.

Field-connection block 60 may be designed to protect against an operator erroneously wiring the field-connection block 60 for one type of power, but actually supplying a different type of power. For example, if an operator desires to utilize 480 VAC three-phase, but accidentally connects two of the 480 VAC conductors to a set of DC lugs, then problems may result. Field-connection block 60 may be designed to automatically sense the type of current and voltage being supplied and take appropriate precautions, or a mechanism may be provided allowing a user to identify what current and voltage will be supplied. Automatic sensing can be accomplished with sensors as are known in the art. A controller within field-connection block 60 can then engage the appropriate switchgear to electrically connect the operator's power supply to the appropriate portions of power converter 30. A power conditioner module may accept any of a wide range of possible input voltages and either permit operation (if within safety limits) or prevent motor operation. Circuit protection can be added to avoid trying to alter the switchgear while current is flowing through the contacts.

Furthermore, when variable-speed motor 10 is an AC motor, and power supply 90 is a DC power supply, then it may be desirable to directly feed the DC power to motor controller 20, which, in turn, will invert the DC power to AC power as part of controlling variable-speed motor 10.

Field-connection block 60 or any other portion of valve actuator 100 may include any necessary current and voltage protection, such as in the form of circuit breakers and surge protectors.

All of the structures and functions described with respect to field-connection block 60 may also be integrated within a single housing with power converter 30, motor controller 20, and/or valve actuator controller 50. That single housing could then be incorporated as part of the valve actuator 100. Additionally, field-connection block 60 and power converter 30 may be fully integrated.

By using a universal power converter 30, a valve actuator manufacturer could make a single valve actuator 100 in a given size range that would be compatible (and off-the-shelf) with any power supply 90 a customer might have. Additionally, by utilizing the variable-speed motor 10, the valve actuator 100 can be compatible with a wide range of valves 80. The solid-state motor controller 20 allows configuration of optimum speed and torque for a given valve 80. The speed and torque could be set by an operator, manufacturer, agent, or distributor. Therefore, a narrow range of valve actuators 100 are able to meet the needs of a wide range of valve applications. The narrow range of valve actuators 100 could be produced in a high enough volume to achieve economies of scale previously not possible with other valve actuators.

Figure 6:
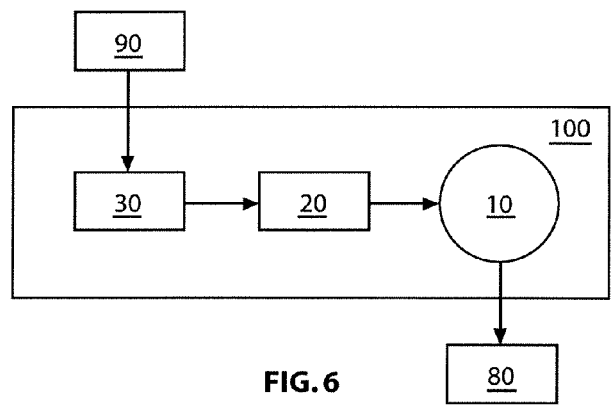
FIG. 6 illustrates an embodiment of a power converter without a gear set.

Valve actuator 100 optionally includes gear set 40. Gear set 40 may be included as part of valve actuator 100 or as a separate piece that may be coupled to valve actuator 100. In one embodiment, the gear set 40 may be a worm/worm-gear set where the worm shaft is directly coupled to the output shaft of variable-speed motor 10 and integrated as part of valve actuator 100. The worm/worm-gear set inherently provides braking or locking for the valve actuator 100 to keep the valve from changing position when the motor is not energized. However, gear set 40 may be other gears such as planetary gear sets. FIG. 6 illustrates an embodiment where the gear set 40 is not present. In this embodiment, the output shaft of the variable-speed motor 10 can be directly coupled to the valve 80.

It is understood that in particular embodiments, a hollow shaft, high pole count, high torque, low speed "pancake" motor could be used to accept the valve stem and directly drive the valve—without a gearbox. For a direct drive, hollow shaft actuator, we would still need to "lock" the actuator in position when stopped. It could be actively held in that position by the controller via a zero speed command to the motor controller. Alternatively, the hollow shaft design could use a three-position motor/handwheel clutching system and solenoid-driven brake. The first position includes motoring with a solenoid brake released or stopped with the solenoid-driven brake engaged. The second position includes the motor being disengaged and the brake engaged (i.e., overrides the solenoid). The third position includes the motor being disengaged, the brake being disengaged (overrides solenoid), and the handwheel being engaged. To operate the handwheel, the lever is moved to position three, the handwheel is turned to a desired valve position, and the lever is moved to position one or two to hold the valve position.

Figure 7:
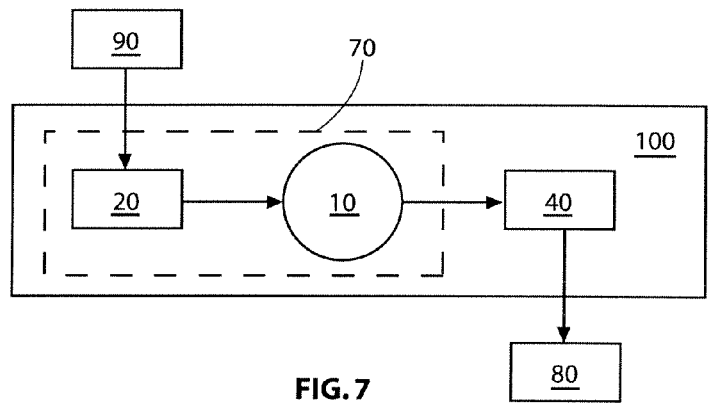
FIG. 7 illustrates an embodiment of a valve actuator where a motor controller and a variable-speed motor are within a separate housing and a gear set located external to the housing.

FIG. 7 illustrates an embodiment where the gear set 40 is present in the valve actuator 100, but the variable-speed motor 10 and the motor controller 20 are contained within a separate housing 70. A power converter 30 may also be present within the housing 70. In one embodiment, housing 70 is a motor housing. For example, the motor controller 20 and power converter 30 may be placed within the motor housing. Alternatively, motor controller 20 and power converter 30 may be placed on housing 70. In such an embodiment, the motor controller 20 and power converter 30 may be wired to the variable-speed motor 10 through a hole in the housing 70. The motor controller 20 and power converter 30 could be suitably covered so that housing 70 has any desired NEMA rating, such as NEMA 4. Additionally, in the embodiments of FIG. 7, the power converter 30 may not be present or may be integrated with the motor controller 20 into a single device. Valve actuator controller 50 may also be located within housing 70. Motor controller 20 may also be integrated within valve actuator controller 50.

Valve 80 may be a multi-turn or quarter-turn valve. Valve 80 may be a globe, gate, sluice, butterfly, plug, ball, or multi-port valve. Valve 80 includes any valve or other actuator-driven loads that may be operated by variable-speed motor 10 with or without gear set 40.

Figure 8:
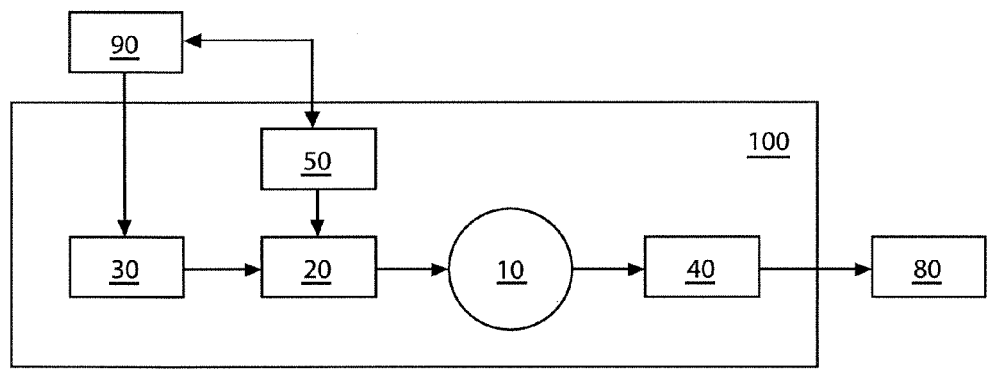
FIG. 8 illustrates the inclusion of a valve actuator controller according to an embodiment of the inventive valve actuator.

Referring to FIG. 8, valve actuator 100 may also include valve actuator controller 50. Valve actuator controller 50 in a particular embodiment is located within actuator housing 70 of valve actuator 100. However, valve actuator controller 50 may alternatively be external to actuator housing 70. For example, valve actuator controller 50 may be mounted on a support structure near the valve actuator 100 with electrical leads connecting the valve actuator controller 50 to the valve actuator 100.

Figure 9:
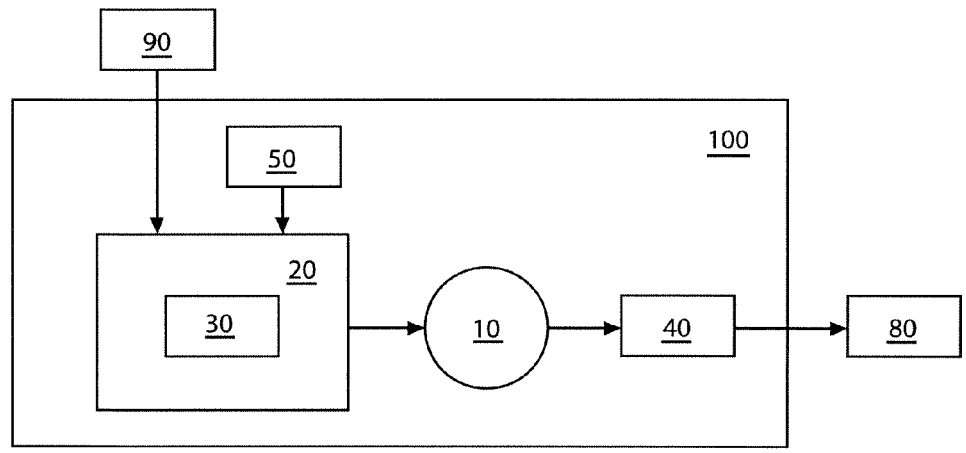
FIG. 9 illustrates an embodiment of the invention where a power converter is integrated as part of a motor controller in communication with a valve actuator controller.
Figure 10:
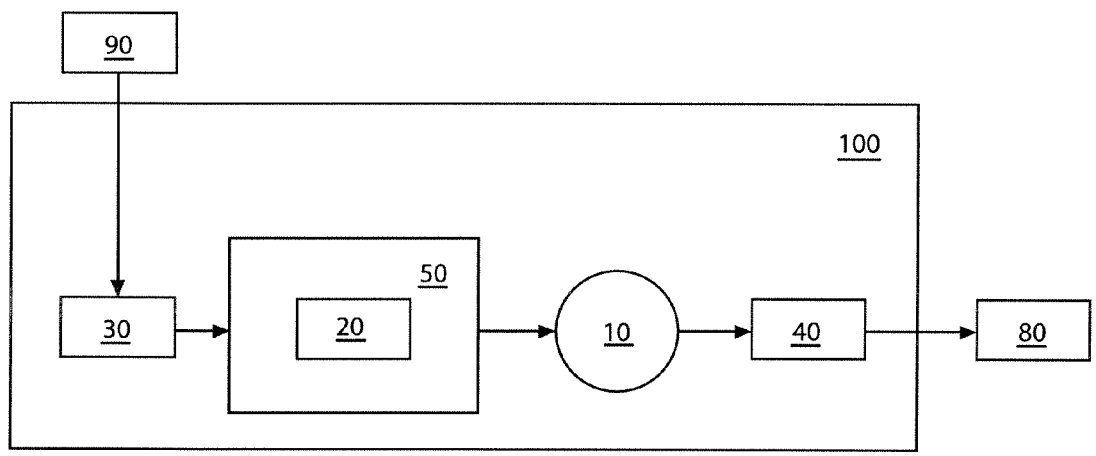
FIG. 10 illustrates an embodiment of the invention where a motor controller is integrated as part of a valve actuator controller that receives input from a power converter.
Figure 11:
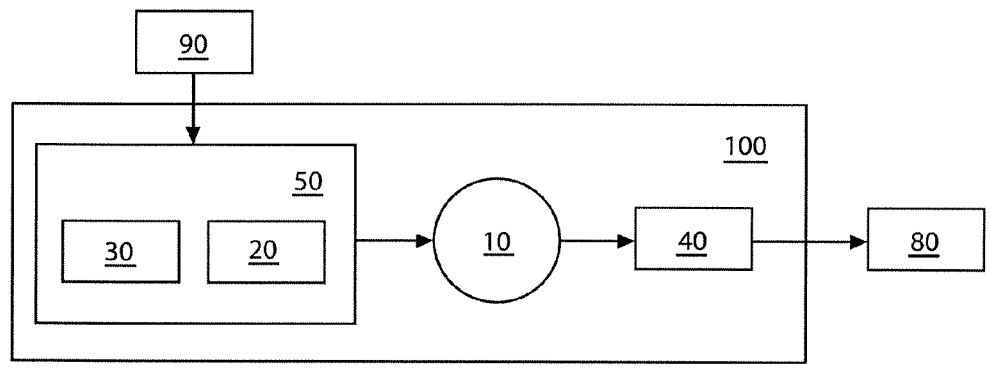
FIG. 11 illustrates the combination of a power converter, motor controller, and valve actuator controller within a single device according to an embodiment of the invention.

In one embodiment, as shown in FIG. 8, valve actuator controller 50 controls motor controller 20. Motor controller 20 may be separate from power converter 30, as shown in FIG. 8, or power converter 30 may be integrated into the same device as motor controller 20, as shown in FIG. 9. FIG. 8 illustrates valve actuator controller 50 as separate from motor controller 20. Alternatively, valve actuator controller 50 may directly receive power from power supply 90 and valve actuator controller 50 may send output signals and status indicators to power supply 90. However, as shown in FIG. 10, motor controller 20 may be integrated into a single device with valve actuator controller 50. FIG. 11 illustrates that power converter 30 may also be integrated into a single device with valve actuator controller 50 and motor controller 20.

It is understood that although the figures show integrating the motor controller 20 into valve actuator controller 50, valve actuator controller 50 may also be viewed as being integrated into motor controller 20. Similarly, the functions performed by motor controller 20 and/or valve actuator controller 50 may also be performed by power converter 30.

Figure 12:
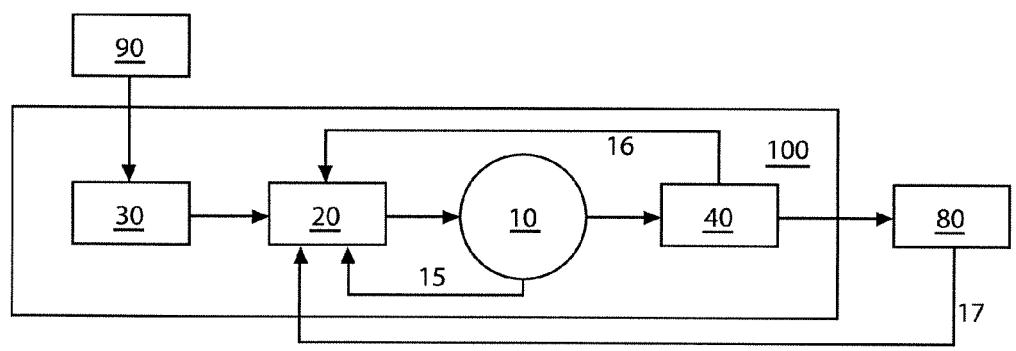
FIG. 12 illustrates examples of different feedback signals that may be received by a motor controller.

The valve actuator controller 50 is capable of both receiving and outputting signals. Valve actuator controller 50 may receive process command signals, process feedback signals, valve position command signals, valve position feedback signals, and motor position signals. Either valve actuator controller 50 or motor controller 20 may receive any number of feedback signals. For example, as illustrated in FIG. 12, variable-speed motor 10 may generate a feedback signal 15 such as a rotor (or armature) position signal(s), rotor speed signal, motor current signal, or motor torque signal. Feedback signal 15 could be used to derive the valve actuator 100 output torque, output speed, and position. Similarly, feedback signal 15 may be used to calculate valve 80 torque, speed, and position. Gear set 40 may be configured to generate feedback signal 16. Feedback signal 16 may indicate valve actuator 100 output torque, speed, and/or position. Feedback signal 16 may also include data on any portion of the gear train, such as the speed and/or torque of a worm shaft or worm gear. Additionally, valve 80 may be configured to generate feedback signal 17. Feedback signal 17 may be used to directly indicate valve 80 torque, speed, and position. FIG. 12 illustrates motor controller 20 receiving feedback signals 15, 16, and 17. However, valve actuator controller 50 may also receive the signals.

Examples of signals that may be sent by valve actuator controller 50 include queries to sensors, operators, motor controller 20, variable-speed motor 10, and other systems outside the valve actuator 100.

Valve actuator controller 50 may operate as a position controller or a process controller. In the position controller embodiment, valve actuator controller 50 can be configured to receive a position command signal. The position command signal can indicate a desired position of the valve. The command signal may be generated by any standard means, such as by a process controller, an operator, switches, potentiometers, process function blocks, signal generators, or position controller. The valve actuator controller 50 can then use the motor controller's 20 knowledge of the rotor position of variable-speed motor 10, via feedback signal 15, to determine the position of valve 80. Feedback signal 15 can essentially serve as the source of a position feedback signal. Valve actuator controller 50 can then determine if there was an error (a difference) between the position command signal and the position feedback signal. If an error is detected, valve actuator controller 50 can then adjust valve actuator 100 to minimize the error. Performance tuning (e.g., response time, allowable overshoot, settling time, and/or allowable error) may be configured by the user or preset to default values by the manufacturer.

In the process controller embodiment, valve actuator controller 50 would be configured to receive a process command signal and a process feedback signal. The process command signal indicates a desired process variable set-point. The process feedback signal indicates the actual condition of the process variable. Valve actuator controller 50 would then determine if there was an error between the two signals and adjust the valve to reduce the error to within a configured acceptance band. Valve actuator controller 50 may incorporate any type of control response, such as, proportional control, proportional plus integral control, proportional plus integral plus derivative control, or proportional plus derivative control.

Valve actuator 100 may be configured to operate valve 80 at either a fixed speed or at a variable speed. In the fixed speed embodiment, the inventive valve actuator 100 may provide improved manufacturing economies of scale. Additionally, valve actuator 100 may be configured to operate at variable speeds.

Valve actuator 100 may be configured by an operator to operate at variable speeds. An operator can have nearly infinite control over the speed at which valve 80 is operated. An operator can choose a set speed for the valve actuator 100 to operate at or can enter a speed profile. A speed profile allows an operator to designate different valve speeds for different portions of the valve 80 stroke. The operator can also set the allowable torque that may be delivered at different speeds and at different locations along the stroke of valve 80. Therefore, the torque and speed of valve 80 can be limited before opening, when first opening, before closing, or when first closing valve 80. In a particular embodiment, valve actuator controller 50 and/or motor controller 20 are solid-state controllers, eliminating the need for torque limit switches to identify when the speed or torque should be changed. Instead, motor controller's 20 knowledge of motor position and torque via feedback signal 15 could be used to determine when to limit or vary the torque and/or speed of valve 80. For example, torque may be deduced from knowledge of motor current, voltage, temperature, back EMF, leakage flux, or any combination thereof. Therefore, when valve actuator controller 50 is a solid-state controller, the operator can change the position along a valve stroke where the speed reduces or increases without having to adjust mechanical switches.

The ability of an operator to vary the fixed speed or speed profile of valve 80 can provide greater flexibility with determining overall system gain. For example, a higher valve speed may equate with a higher system gain and, conversely, a lower valve speed may equate with a lower system gain. Furthermore, because of the relationship between valve speed and system gain, the variable-speed ability of valve actuator 100 provides a tool to an operator to fine tune a control system. This may be particularly advantageous in sensitive control systems where it is difficult to find tuning constants that allow a system to calm down.

Additionally, once tuning constants are selected, an operator can vary the speed of valve 80 rather than alter the tuning constants. This may be particularly advantageous in a process where an operator has a limited set of tuning constants that avoid problems associated with HD controllers, such as integral wind-up and other problems known in the art. In such a scenario, adjusting valve speed may be more beneficial than changing the controller tuning constants.

For example, many operators try to avoid shutting down a process to perform maintenance on a valve. Instead, an operator will try to keep a valve sufficiently operational until a given time of year when the entire process will be shut down and any needed repairs are performed at one time. Therefore, when a valve starts sticking, some operators will adjust the tuning constants of a controller to try to compensate for the sticking valve. Essentially, an operator may change the controller tuning constants to try to command the valve to change position sooner or to a greater degree in order to approximate an actual result that is similar to the pre-sticking valve process condition. Alternatively, the closed loop position controller of the present invention can adjust the motor voltage as necessary, all the way up to full voltage (max tq) in an attempt to achieve the command speed. By adjusting a timer or the Ki constant in the controller's timing parameters, the operator may adjust the behavior of an actuator as a valve grows more sticky.

However, for complex or sensitive systems, there may be a limited set of tuning constants that actually provide for a stable process. By adjusting the valve actuator controller 50 to vary the speed at valve 80, rather than just varying a fixed speed, a valve speed profile can be adjusted or created to accommodate whatever problem the valve is having. If a valve is sticking only upon opening, then greater torque could be supplied when first opening the valve. If a valve is sticking in the middle of the valve stroke, then the speed or torque could be increased over the range where the valve is sticking.

Valve actuator 100 may be designed with appropriate logic in valve actuator controller 50 to determine the speed at which to actuate valve 80. Such logic can be integrated into the valve actuator controller 50 when valve actuator controller 50 is functioning as a process controller. In this embodiment, valve actuator controller 50 can determine at which speed variable-speed motor 10 will operate to turn gear set 40 and, in turn, actuate valve 80. For example, valve actuator controller 50 may be designed so that valve 80 is actuated at a high speed when the difference between a process variable set point and process variable feedback is large. Likewise, when the error (the difference) between process signals is small, then valve 80 is actuated at a low speed. Valve actuator controller 50 may be set with a limited set of speeds pre-selected to correspond to a given magnitude of error. Alternatively, valve actuator controller 50 may have essentially infinite speeds at which valve 80 may be actuated depending upon the corresponding error.

Valve actuator controller 50 may also be designed so that a first response to a process variable set-point change results in valve 80 being actuated at a high speed, and subsequent changes to the position of valve 80 occur at lower and lower speeds. Such an approach may be useful in avoiding integral wind-up. Valve actuator controller 50 may be designed to respond in numerous ways, as will be apparent to one of ordinary skill in the art. Programming controllers and controller hardware are known in the art. Therefore, the exact software, hardware, and/or firmware used in valve actuator controller 50 is not discussed herein.

Figure 13:
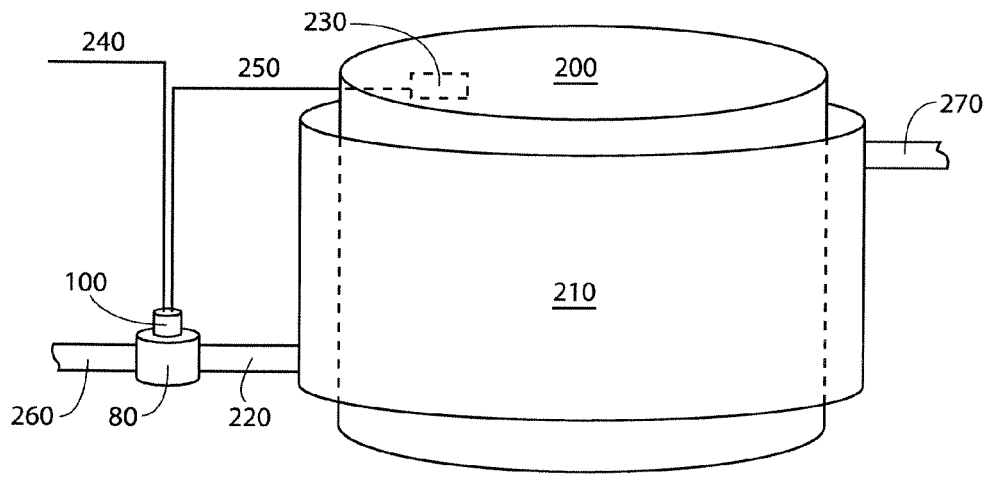
FIG. 13 illustrates an embodiment of a valve actuator operating as a process controller.

Referring to FIG. 13, one example of using valve actuator controller 50 as a temperature process controller is described. Reactor vessel 200 has a heating jacket 210 around its sides. The inputs and outputs of reactor vessel 200 have not been shown. Pipe 220 supplies hot water to heating jacket 210. The heat from the hot water in heating jacket 210 is transferred to reactor vessel 200. The greater the flow rate of fresh hot water into heating jacket 210, the higher the temperature of reactor vessel 200. The flow rate of hot water is controlled by valve 80. The inlet of valve 80 is connected to pipe 260. Hot water that has circulated through heating jacket 210 exits via pipe 270. Valve 80 is turned by valve actuator 100. Signal 240 is the process command signal sent to valve actuator controller 50 indicating the temperature set-point for reactor vessel 200. The source of signal is not indicated in FIG. 13. Signals 240 and 250 may be in the form of a 0-20 or 5-20 mA signal, 0-10 or 0-50 mV signal, 0-5, 1-5, or 0-10 Vdc signal, or a digital message on a digital communication bus (Modbus, Foundation Fieldbus, Profibus, ASi, DeviceNet, Internet, Ethernet, etc.) or any other controller signal form. Signal 250 is the process feedback signal sent to valve actuator controller 50 from temperature sensor 230.

For simplicity, in this example, the position of valve 80 is assumed to be calibrated to different flow rates of hot water. In practice, at least one hot water flow sensor, as well as other sensors, may also feed signals to valve actuator controller 50. Additionally, any number of temperature sensors 230 may be used.

When a minor change in temperature is sensed by temperature sensor 230, valve actuator controller 50 may, in response, change the position of valve 80 a corresponding minor amount and at a relatively slow speed. Alternatively, should a large temperature drop be sensed, then valve actuator controller 50 may open valve 80 a greater amount and at a relatively higher rate of speed. Valve actuator controller 50 may have a given set of speeds, such as very low, low, medium, high, and very high, that, depending upon the degree of difference between signal 240 and signal 250, determines which speed is used to actuate valve 80. Valve actuator controller 50 may also have an essentially infinite number of speeds at which the valve 80 may be actuated. Valve actuator controller 50 may be configured to also sense not only the difference between signals 240 and 250, but changes to signal 240 itself. For example, should the temperature set-point be dramatically increased by an operator, the valve actuator controller 50 may open valve 80 slowly to gradually increase the temperature of reactor vessel 200. However, should a change in signal 250 be the source of the error between signals 250 and 240, then the valve actuator controller 50 can cause valve 80 to change position rapidly.

Valve actuator controller 50 may be primarily software, hardware, firmware, or combinations thereof. Valve actuator controller 50 may be designed to interface with a PC, or to interface with other control hardware and software. Motor controller 20 and valve actuator controller 50 may receive power from either power supply 90 or a separate power supply, as is known in the art.

While disclosed with particularity, the foregoing techniques and embodiments are more fully explained and the invention described by the following claims. It is clear to one of ordinary skill in the art that numerous and varied alterations can be made to the foregoing techniques and embodiments without departing from the spirit and scope of the invention. Therefore, the invention is only limited by the claims.

What is claimed is:

1. A valve actuator comprising:
a variable-speed motor;
a solid-state motor controller operably connected to the variable-speed motor and configurable to operate the variable-speed motor in a manner providing a valve stroke with a continuously varying speed determined by a speed profile entered by a valve operator;
a braking device operably connected to the variable-speed motor, the braking device comprised of a gear set locking the variable-speed motor against back-driving loads in the event of a power failure;
a power converter configured to receive electrical information from a power supply and to output an electrical supply to the solid-state motor controller; and
a housing, wherein the variable-speed motor, the solid-state motor controller, and the power converter are integrated within the housing.

2. The valve actuator of claim 1, wherein the variable-speed motor is selected from the group consisting of an AC synchronous reluctance motor with motor position feedback, an AC synchronous reluctance motor without motor position feedback, a DC brushless motor without motor position feedback, and a DC brushless motor with motor position feedback.

3. The valve actuator of claim 1, wherein the variable-speed motor is an AC motor selected from the group consisting of: single-phase induction motors, poly-phase induction motors, wound-rotor motors, multi-speed motors, constant torque motors, variable torque motors, universal motors, synchronous hysteresis motors, DC-excited synchronous motors, servomotors, brushless servomotors, and linear motors.

4. The valve actuator of claim 1, wherein the variable-speed motor is a DC motor selected from the group consisting of: shunt-wound, series-wound, compound-wound, brushless DC motors, linear motors, brushless linear motors, coreless motors, ring motors, pancake motors, limited-angle torque motors, permanent magnet stepper motors, variable reluctance motors, switched reluctance motors, and servomotors.

5. The valve actuator of claim 1, wherein the power converter comprises a universal power converter configured to convert any commonly used voltage and current type into a form usable by the solid-state motor controller.

6. The valve actuator of claim 1, further comprising a valve actuator controller.

7. The valve actuator of claim 6, wherein the valve actuator controller is integral to the valve actuator.

8. The valve actuator of claim 6, wherein the solid-state motor controller is integrated within the valve actuator controller.

9. The valve actuator of claim 1, further comprising a field-connection block operably coupled to the solid-state motor controller.

10. A valve actuator comprising:
a universal field-connection block;
a power converter operable to receive a power supply, and the power converter configured to output a electrical supply to a solid-state motor controller;
a variable-speed motor;
the solid-state motor controller operably connected to the power converter and the solid-state motor controller configurable to operate the variable-speed motor in a manner providing a valve stroke with a continuously varying speed determined by a speed profile entered by a valve operator;

a braking device operably connected to the variable-speed motor, the braking device comprised of a gear set locking the variable-speed motor against back-driving loads in the event of a power failure; and a housing, wherein the variable speed motor, the solid-state motor controller, and the power converter are integrated within the housing.

11. A valve actuator comprising:

a housing;

a motor controller;

a variable-speed motor with an output shaft, wherein the variable-speed motor is configured for control by the motor controller, and the motor controller is configured to operate the variable-speed motor at at least one of a continuously varying speed and a continuously varying torque over an entire valve stroke determined by one or more of an associated speed profile and torque profile entered by a valve operator;

a power converter configured to receive electrical input from a power supply and to output an electrical supply to the motor controller;

the power converter, the motor controller and the variable-speed motor integrated within the housing; and a gear train outside of the housing and operatively coupled to the output shaft.

12. The valve actuator of claim 11, wherein the power converter is a universal power converter configured to convert any commonly used voltage and current type into a form usable by the motor controller.

13. A system for actuating a valve, the system comprising:

a valve actuator, wherein the valve actuator comprises:

a motor, wherein the motor comprises an output shaft; and a solid-state motor controller operably connected to the motor and capable of operating the motor at continuously varying speeds and torques according to a speed profile and a torque profile entered by a valve operator;

a power converter configured to receive electrical input from a power supply and to output an electrical supply to the solid-state motor controller;

a housing, wherein the valve actuator and the power converter are integrated within the housing; and a gear set coupled to the output shaft of the motor, the gear set locking the output shaft against back-driving loads in the event of a power failure.

14. A method of operating a valve actuator, the method comprising:

providing a valve actuator comprising a solid-state motor controller operably connected to a variable-speed motor, wherein a gear set is operably connected to the variable-speed motor;

providing a power converter configured to receive electrical input from a power supply and to output an electrical supply to the solid-state motor controller, wherein the power converter, the solid-state motor controller, and the variable-speed motor are integrated within a housing;

setting a speed profile for the valve actuator on the solid-state motor controller, the speed profile determining continuously varying speeds at which the variable-speed motor will be driven by the solid-state motor controller when the valve actuator is operated; and locking the variable-speed motor with the gear set against back-driving loads in the event of a power failure.

15. The method according to claim 14, further comprising setting the torque on the solid-state motor controller that will be generated by the variable-speed motor when the valve actuator is operated.

16. A method of actuating an electrically driven valve actuator, the method comprising:

receiving a command signal at a solid-state valve actuator controller operably connected to the electrically driven valve actuator including a gear set, the command signal comprising a process variable set-point signal, the gear set locking the electrically driven valve actuator against back-driving loads in the event of a power failure, wherein the solid-state valve actuator controller is coupled to a power converter configured to receive electrical input from a power supply and to output an electrical supply to the solid-state valve actuator controller, the power converter and the solid-state valve actuator controller are integrated within a housing, and the electrically driven valve actuator is capable of variable speeds;

receiving a feedback signal at the solid-state valve actuator controller, the feedback signal comprising a process variable feedback signal;

determining if there is a difference between the command signal and the feedback signal; and minimizing any difference between the command signal and the feedback signal by actuating the electrically driven valve actuator at a constant speed or at varying speeds over the length of a valve stroke.

17. The method according to claim 16, wherein the command signal comprises a position command signal and the feedback signal comprises a motor position signal.

* * * * *